US011131550B2

(12) United States Patent
Jin et al.

(10) Patent No.: US 11,131,550 B2
(45) Date of Patent: Sep. 28, 2021

(54) METHOD FOR GENERATING ROAD MAP FOR VEHICLE NAVIGATION AND NAVIGATION DEVICE

(71) Applicant: WeRide Corp., Sunnyvale, CA (US)

(72) Inventors: Qiu Jin, Sunnyvale, CA (US); Yiqing Yang, Sunnyvale, CA (US); Huan Chen, Sunnyvale, CA (US); Chao Lin, Sunnyvale, CA (US); Hua Zhong, Sunnyvale, CA (US); Zhenzhen Kou, Sunnyvale, CA (US)

(73) Assignee: WERIDE CORP., San Jose, CA (US)

( * ) Notice: Subject to any disclaimer, the term of this patent is extended or adjusted under 35 U.S.C. 154(b) by 217 days.

(21) Appl. No.: 16/359,991

(22) Filed: Mar. 20, 2019

(65) Prior Publication Data

US 2019/0301872 A1    Oct. 3, 2019

Related U.S. Application Data

(60) Provisional application No. 62/649,573, filed on Mar. 29, 2018.

(51) Int. Cl.
*G01C 21/32* (2006.01)
*G01C 21/36* (2006.01)
*G06K 9/00* (2006.01)

(52) U.S. Cl.
CPC ......... *G01C 21/32* (2013.01); *G01C 21/3655* (2013.01); *G06K 9/00798* (2013.01); *G06K 9/00818* (2013.01); *G06K 9/00825* (2013.01)

(58) Field of Classification Search
CPC .. G01C 21/32; G01C 21/3655; G06K 9/0798; G06K 9/00818; G06K 9/00825
See application file for complete search history.

(56) References Cited

U.S. PATENT DOCUMENTS

| 2012/0095682 | A1* | 4/2012 | Wilson | B60W 40/10 |
| | | | | 701/532 |
| 2015/0345966 | A1* | 12/2015 | Meuleau | G01C 21/3453 |
| | | | | 701/23 |
| 2017/0089709 | A1* | 3/2017 | Marusco | G01C 21/206 |
| 2018/0128636 | A1* | 5/2018 | Zhou | G01C 21/3697 |
| 2018/0188059 | A1* | 7/2018 | Wheeler | G01C 21/32 |
| 2018/0239352 | A1* | 8/2018 | Wang | B60W 30/182 |

\* cited by examiner

*Primary Examiner* — Peter D Nolan
*Assistant Examiner* — Demetra R Smith-Stewart
(74) *Attorney, Agent, or Firm* — Jun He Law Offices P.C.; James J. Zhu

(57) ABSTRACT

A method for generating a road map for vehicle navigation comprises: providing original road image data having an image of a road; identifying boundary lines defining respective lane segments of the road from the original road image data; associating traffic properties with the lane segments defined by the boundary lines, respectively; grouping the lane segments to generate road segments; and combining the road segments with traffic control objects corresponding thereto so as to generate the road map for vehicle navigation.

16 Claims, 8 Drawing Sheets

METHOD FOR GENERATING ROAD MAP FOR VEHICLE NAVIGATION AND NAVIGATION DEVICE

CROSS-REFERENCE TO RELATED APPLICATIONS

The present application claims the benefit of U.S. provisional patent application 62/649,573, filed Mar. 29, 2018, the disclosure of which is incorporated herein by reference in the entirety.

TECHNICAL FIELD

The application generally relates to navigation and digital mapping technologies, and more particularly, to a method for generating a detailed machine-readable road map for navigation system of autonomous driving.

BACKGROUND

Vehicle navigation allows a car driver to see where he or she is in a map. Typically, a satellite navigation device or an inertial measurement unit (e.g. an accelerometer or a gyrosensor) can be used to get a position of the vehicle, so that routing can be calculated based on the position of the vehicle in the map when directions are needed. Most navigation systems rely on a display screen to communicate navigation information to drivers, such as maps, maneuver lists with sequenced turn directions and turn-by-turn guidance displays which generally pop up in advance of a turn. Some navigation systems may also use a speaker to notify drivers of the maneuver lists or traffic information so that the drivers do not need to look at the display screen very frequently.

Maps can be effectively used to plan a route since they provide a pictorial representation of an area or region. However, the maps of conventional navigation systems fail to convey enough information for autonomous driving. Thus, there is a continued need for further improvement.

SUMMARY

An objective of the application is to provide a method for generating and using a road map which contains navigation information useful for autonomous driving.

In a first aspect of the application, there is provided a method for generating a road map for vehicle navigation, comprising: providing original road image data having an image of a road; identifying boundary lines defining respective lane segments of the road from the original road image data; associating traffic properties with the lane segments defined by the boundary lines, respectively; grouping the lane segments into road segments; and combining the road segments with traffic control objects corresponding thereto so as to generate the road map for vehicle navigation, wherein the traffic control objects have respective traffic control indications that can affect a traffic flow in the road segments.

In another aspect of the application, there is provided a navigation device, which comprises: a data storage for storing a road map for vehicle navigation, wherein the road map comprises one or more road segments of a road which are defined by respective boundary lines and associated with respective traffic properties, and one or more traffic control objects corresponding to the one or more road segments and having respective traffic control indications that can affect a traffic flow in the road segments; a positioning module for detecting a present position of a vehicle; and a processor configured to: receive a destination of the vehicle, and calculate a route for the vehicle based on the road map, the present position of the vehicle and the destination of the vehicle.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION

Figure 1:
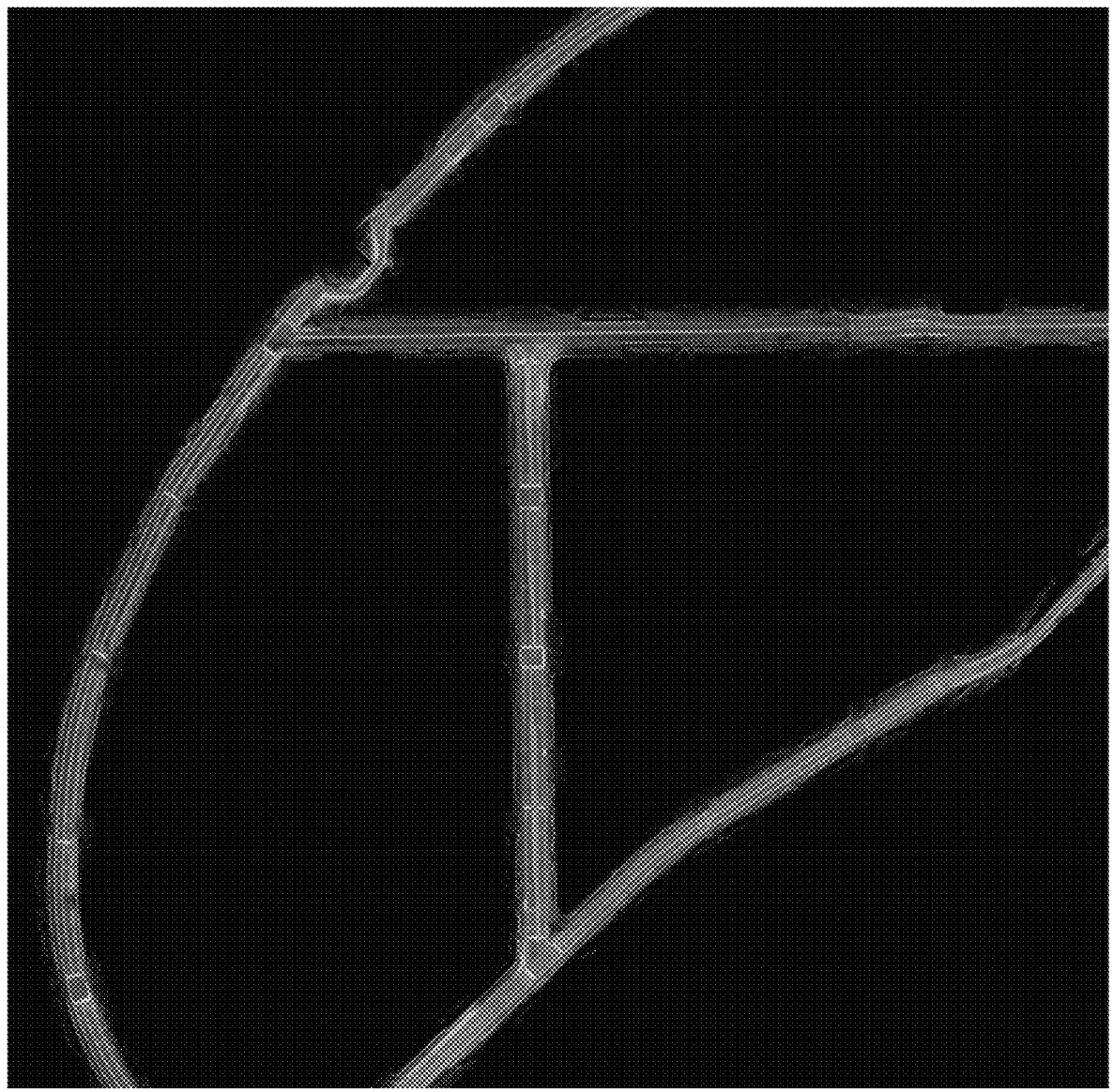
FIG. 1 illustrates an exemplary original road image.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure.

Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The present disclosure relates to methods and systems for generating high definition maps, e.g., used in autonomous driving. For the sake of brevity, conventional techniques and components related to the autonomous driving technology and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Autonomous vehicles (also known as driverless cars, self-driving cars or robot cars) are capable of sensing its environment and navigating without human input. Autonomous vehicles may be equipped with a high precision GPS navigation system and several laser scanners which are used to detect obstacles. Autonomous vehicles may also be configured to sense their surroundings using technologies such as camera, radar, Light Detection and Ranging (LIDAR), GPS, and other sensors. Advanced control systems interpret sensory information to identify appropriate navigation paths, as well as obstacles and relevant signage. Some autonomous vehicles update their maps based on sensory input, allowing the vehicles to keep track of their position even when conditions change or when they enter uncharted environments.

However, sensory input is limited by the effective range of the sensors, which are vulnerable to weather conditions such as fog or heavy rain. Further, sensory information is often deprived or obscured by obstacles or around curves. A road map is therefore needed to work in conjunction with sensors to allow autonomous vehicles to understand the real world and exactly where to selectively focus attention in order to drive safely and efficiently.

Hence, the present disclosure in one aspect provides a road map used for autonomous driving. The road map disclosed herein contains navigation information such as lane geometry with lane boundaries, lane traversal information, lane types, lane marking types, lane level speed limit information, etc. The road map dataset may be stored in the autonomous vehicle. Alternatively, the road map dataset is stored and updated in a server (e.g., a cloud) that communicates with the autonomous vehicle and provides the map information necessary for the autonomous vehicle to use.

The mechanisms by which autonomous vehicle uses the road map in driving are known in the art (see e.g., H Seif and X Hu, Autonomous Driving in the iCity—HD Maps as a key Challenge of the Automotive Industry, *Engineering* (2016) 2:159-162). In certain embodiments, the navigation information of the road map disclosed herein is supplied to the autonomous vehicle in the forms of waypoints. Each waypoint contains information of lane geometry with lane boundaries, lane type and direction, lane speed limit, left/right lane segment, along with critical traffic control information and associated critical traffic zones (e.g., crosswalk and etc.). In certain embodiments, depending on the location of the autonomous vehicle, only waypoints near the autonomous vehicle, e.g., within the range of 200-300 meters, are provided. The autonomous vehicle uses the waypoints in conjunction with the sensory information to plan the path and control the motion.

Typically, waypoints are connected to form lines or curves to which the motion of the autonomous vehicle follows. For example, the waypoints in certain embodiments may locate in the center of each lane. Hence the waypoints in the same lane form a centerline of the lane. Driving on the centerline ensures that the autonomous vehicle drives within the lane. In certain circumstances, however, for example in road connection regions, connection between waypoints may be complicated and not intuitive. Therefore, the present disclosure in another aspect provides methods of generating road maps for autonomous vehicle navigation.

The invention disclosed in the present application may be understood through the following exemplary embodiments and the accompanying drawings. Unless otherwise stated in the context, similar symbols generally represent similar components in the accompanying figures. The illustrative embodiments in the following detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are implicitly included in the application.

FIG. 1 illustrates an exemplary original road image based on which a HD map of the present disclosure can be generated. As shown in FIG. 1, the original road image stored as a digital format contains an image of a road network within a specific geographical area or territory. The road network may have several roads and a background of the roads such as houses, lands, rivers or the like. In some embodiments, the original road image can be generated from sensor data, for example, captured by sensors such as LiDAR (Light Detection and Ranging) sensors, radar sensors, cameras or any other suitable types of sensors.

FIGS. 2A-2E illustrate a process of generating a road map for vehicle navigation. The road map can be generated based on original road image data such as the original road image shown in FIG. 1. Moreover, some other information useful for vehicle navigation can be contained in the road map which will be detailed below. It will be readily appreciated by those skilled in the art that the size of the road map generated may vary depending on the size of the original road image. And in some examples, the original road image may be divided into several portions which can be processed separately and combined together afterwards. Moreover, the road maps generated are vector maps which include vector-based collections of geographic information system (GIS) data about a place such as a town, a city or the like at various levels of detail.

In some embodiments, the original road image is divided into processing units called road segments. Typically, a road segment starts from and/or ends at a road connection region, and a road segment connects to another road segment only at it two ends. The generation of road segments from the original road image can be understood in the exemplary embodiment illustrated in FIGS. 2A-2C.

Figure 2A:
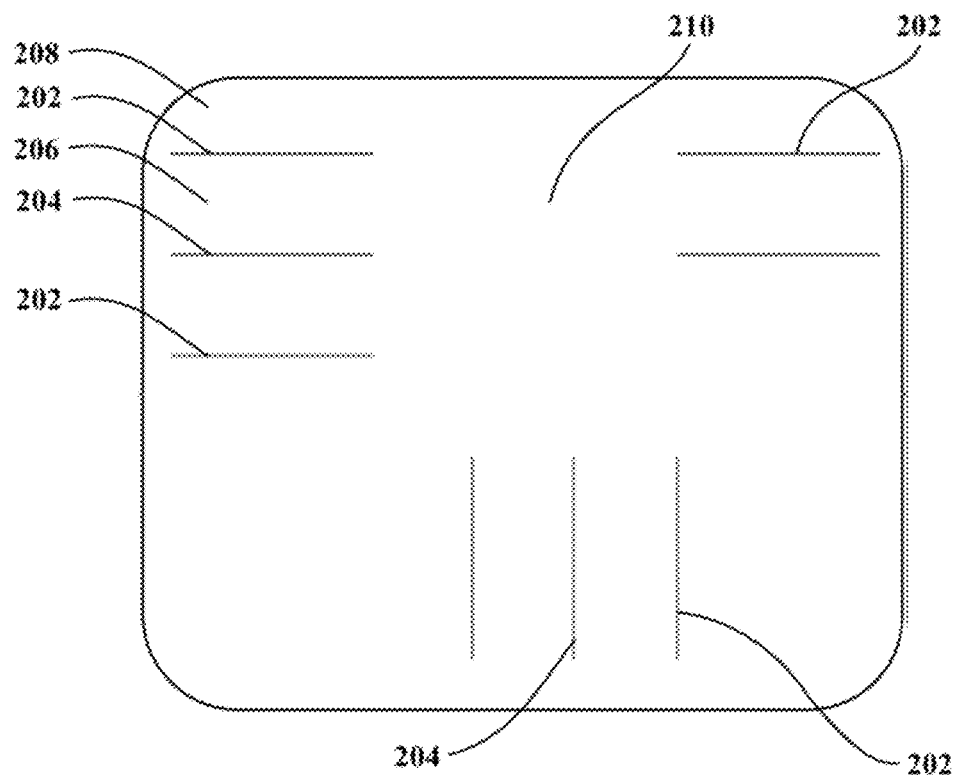
FIGS. 2A-2E illustrate a process of generating a road map for vehicle navigation according to an embodiment of the application.
Figure 2B:
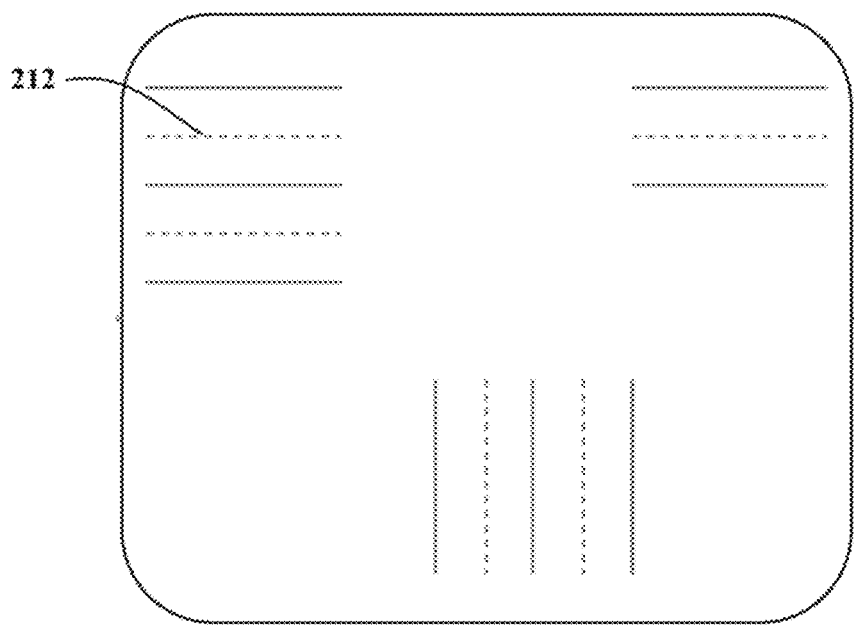
Figure 2C:
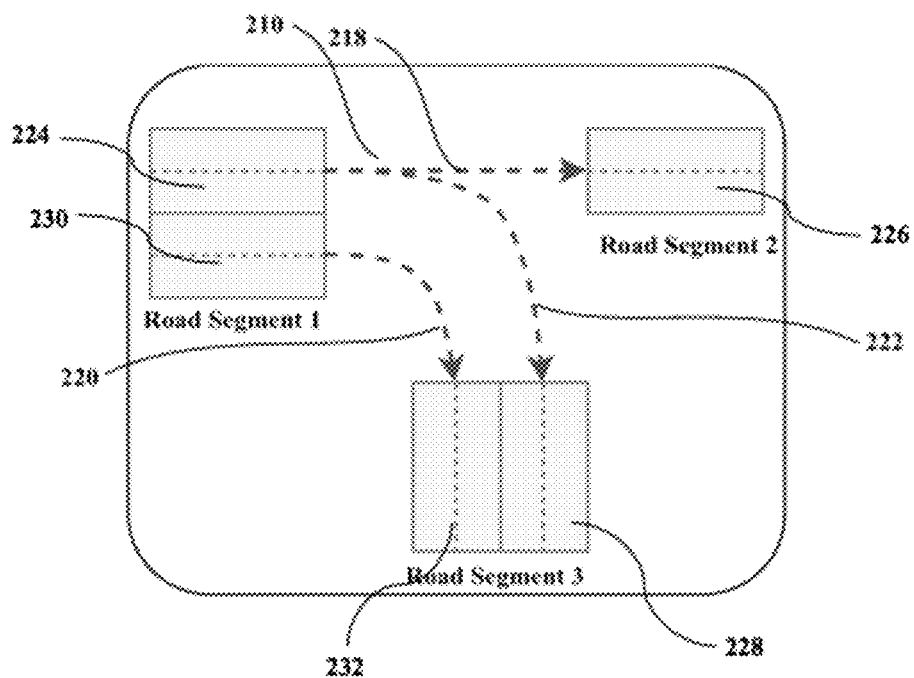
Figure 2D:
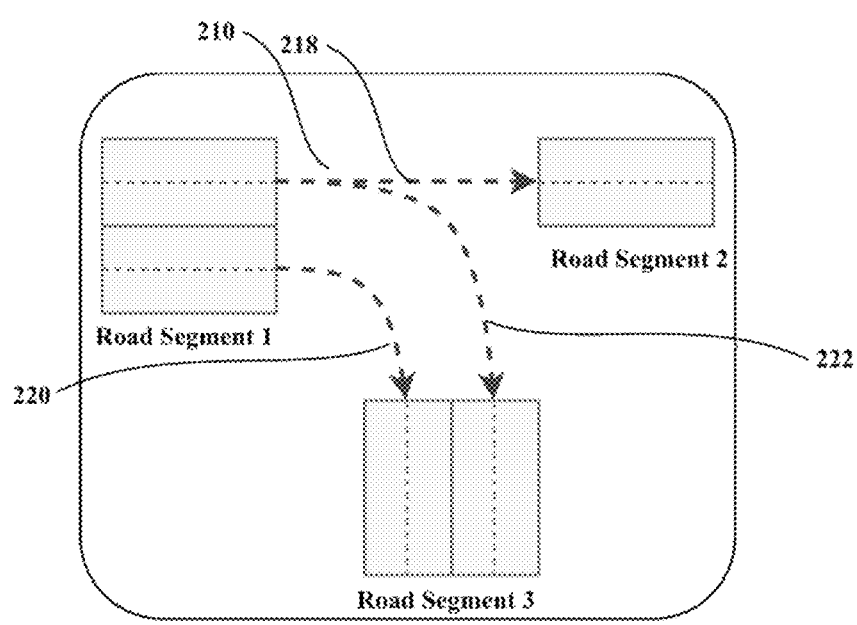

In the first step to generate the road map of the present disclosure, boundary lines are labeled based on the original road image. Referring to FIG. 2A, a group of boundary lines that define certain boundaries contained in the original road image data are identified. For example, the boundary lines 202 follow respective curbs of the roads, which separate drive regions 206 and non-drive regions 208. In some examples, the non-drive regions 208 may be sidewalks, bikeways, yards, buildings or houses aside of the drive regions 206 that vehicles generally cannot drive into or drive through. The boundary lines 204 define the lane separators that divide the road into different driving lanes. It can be understood that some roads may have only one driving lane, and thus the boundary lines 204 may not be identified for such roads. In such case, the boundary lines that define the road also define the driving lane. Additional boundary lines may define central separation belts, lines or greenbelts of the roads, which separate two ways of the roads; fences that separate the roads/lanes, island boundaries, etc.

The boundary lines 202 and 204 may be discontinued by road connection regions such as a road connection region 210. The road connection regions enable traffic communication among different lane segments. In some examples, the boundary lines may be discontinued by some other regions such as a crosswalk region, a keep clear region, a bump region or a traffic control line (e.g. a stop line). In some other examples, the boundary lines may be discontinued by entrances or exits of the lane segments.

In some examples, the boundary lines may be identified or labelled automatically by processing the original road image data with certain image recognition algorithm. For example, the original road image data may include original lane separation lines, and thus the lane boundaries can follow these original lane separation lines. In some cases where the original lane separation lines are not provided in the original road image data, the lane boundaries may be identified based on the boundary lines and traffic rules. For example, a distance between two parallel boundary lines defining a drive region may be 15 meters and a minimum lane width in accordance with the traffic rules is 4 meters, then three driving lane may be identified, which have lane widths of 5.2 meters, 4.6 meters and 5.2 meters, respectively, for example. And corresponding lane boundaries are added to the road map. In some alternative examples, the boundary lines may be labelled by human operations. In some examples, a computer processing the road map receives instruction from a human being to add the identified boundary lines into the road map.

In the second step of the exemplary embodiments, lane segments are generated based on the lane boundaries identified in the first step, and navigation information is associated with the lane segments generated such that each lane segment has certain traffic properties. The navigation information to be associated may include lane width, lane's hard/soft boundaries (i.e., whether a vehicle is allowed to pass through the lane boundary) and speed limit, etc. In certain embodiments, a lane centerline comprising driving waypoints is generated for each lane segment. In certain embodiments, the navigation information is associated with the waypoints such that an autonomous vehicle can use the waypoints in conjunction with the sensory information to plan the path and control the motion. As a result, associating navigation information with a lane segment can be achieved by associating the navigation information with the waypoints within the lane segment. In certain embodiments, the navigation information associated with the waypoints within a lane segment is generally the same or similar except that the waypoints at the ends of the lane segment may have different navigation information. Now referring to FIG. 2B, lane centerlines 212 of the lane segments can be generated in the respective lane segments. Each lane centerline 212 comprises a series of waypoints (dash dot). In certain embodiment, waypoints are set in every about 0.5, 1, 1.5, 2, 2.5, 3 or more meters. Driving on the lane centerline ensures that an autonomous vehicle drives within the lane. In some examples, the lane centerlines 212 can be identified or labelled by human operations, or be generated automatically based on the width of each lane.

In certain embodiments, the navigation information associated with waypoints (i.e., with lane segment) may include traffic property "pass through prohibited" which prohibits a vehicle from changing lanes, or a traffic property "pass through permitted" which permits a vehicle to change lane.

In certain embodiments, the navigation information associated with waypoints/lane segments may include specific speed limits such as a maximum speed or a minimum speed. In certain embodiments, the navigation information associated with waypoints/lane segments may include a traffic property which permits driving of a car but prohibits driving of a truck. As such, different types of vehicles may use such navigation information differently. In certain embodiments, the navigation information associated with waypoints/lane segments may include a specific turn direction (e.g. left, straight, right or U-turn) that a vehicle may take when driving out of the lanes. It can be readily appreciated that other traffic properties can be associated, such as railway, etc. with the waypoints/lane segments.

In the third step of the exemplary embodiments, the lane segments generated in the second step described above are grouped into road segments. Typically, lane segments are grouped to generate a road segment when the lane segments are next to each other, start from and end at the same connection regions. Now referring to FIG. 2C, road segments 1, 2 and 3 are generated by grouping the lane segments next to each other as generated in FIG. 2B. The boundaries of the road segments can be identified based on the boundary lines identified in FIG. 2A. For example, boundary lines 202 define the boundaries of the road segments. Additional boundary lines, such as boundary lines 214 and 216, may be identified based on the separation of drive regions and other functional regions such as the cross walk regions, the keep clear regions, the bump regions or the road connection regions (e.g. the road connection region 210). The boundary lines 202, 214 and 216 define together a drive region "Road Segment 2". As can be seen, the boundary line 214 may define the road connection region 210 with other boundary lines. Similarly, the boundary line 216 may define another road segment such as a keep clear region (not shown) adjacent to the drive region "Road Segment 2".

When the lane segments are grouped, the navigation information of these lane segments are linked or shared. As a result, when a vehicle drives in a lane segment within a road segment, the vehicle can obtain the navigation information of the other lane segments in the same road segments, which allows the vehicle to obtain necessary information to plan the route. For example, when the vehicle drives in a lane segment in the middle of a road segment, the vehicle can obtain the information such as how many lane segments are in the road segment, which lane segment can be used to make a left or right turn, and which lane can be used to exit the road segment, etc.

After the road segments are generated, various traffic properties may be associated with the road segments. For example, the road segments may be associated with turn directions, speed limits or the like, the keep clear region may be associated with a traffic property which prohibits a vehicle to stop in the region, and the crosswalk region may be associated with a traffic property which permits people to walk through the region. Moreover, other traffic properties such as stop line and yield line can be associated with corresponding road segments in the road map. The traffic properties help routing calculation when navigation based on the road map is required for a vehicle. It should be noted that the traffic properties mentioned above are exemplary and not intending to limit the scope of the application.

In the fourth step of the exemplary embodiments, connections are generated to connect the lane segments and road segments generated in the previous steps. In some embodiments, connection lines or curves connect the waypoints at the ends of two lane segments. As a result, an autonomous vehicle may drive on the connection lines or curves to move from one lane segment to another. Now referring to FIG. 2D, the lane segments of two neighboring road segments can be connected through respective connection lines. For example, lane segment 224 of the "Road Segment 1" is connected to lane segment 226 of the "Road Segment 2" through a connection line 218, and to lane segment 228 of the "Road Segment 3" through connection line 222. Lane segment 230 of the "Road Segment 1" is connected to lane segment 232 of the "Road Segment 3" through connection line 220. The connection lines are generally within the road connection region 210 and help to locate a vehicle when it drives through the road connection region 210.

Similar to the lane centerlines, the connection lines may include waypoints. In certain embodiments, connection lines or curves can associate with navigation information such as speed, turning intention, traffic control rules (e.g., roads need to be respected).

In certain embodiments, connection curves are generated with optimization algorithms so that the resulting curves can be followed by the planning and control modules. For example, to avoid sharp change of driving direction and speed, connection curve 220 is generated by taking consideration of not only the waypoints at the end of the lane segments to be connected, but also the waypoints within the lane segments, e.g., at least 1, 2, or 3 waypoints closest to the waypoints at the end. As a result, an autonomous vehicle can transit between two lane segments smoothly.

Figure 2E:
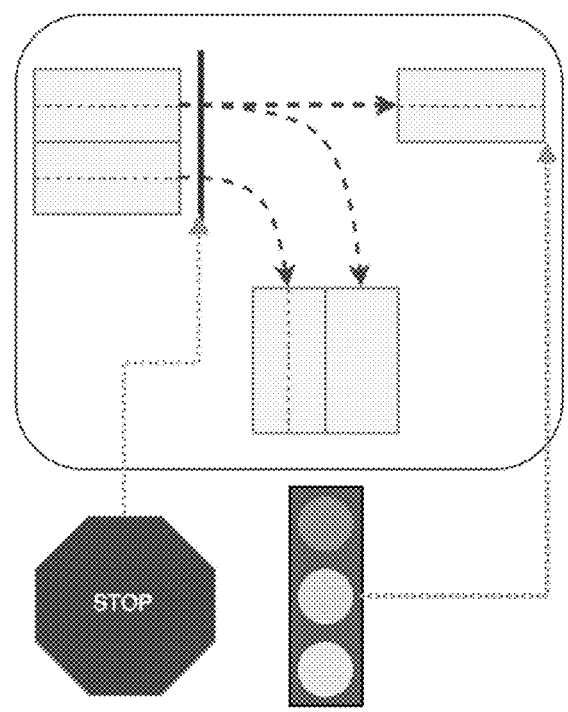

In certain embodiments, traffic control objects which have respective traffic control indications can be further combined with the lane segments and road segments. The traffic control indications can affect a traffic flow in the road segments. For example, as shown in FIG. 2E, the traffic control objects may include traffic control lights, traffic control signs, traffic control bulletins or traffic control patterns (e.g. stop lines). Generally, the traffic control patterns are placed on the road surfaces and thus can be identified through processing the original road image data. However, the traffic control lights, signs (e.g. stop signs, yield sign, route sign or the like) and bulletins (either electronic or non-electronic) generally stand on or hang above the road surface which may not be able to be identified through a plane view of the roads. In some embodiments, these traffic control objects and their respective positions in the road map can be identified through a street view of the roads.

The road maps generated according to the process shown in FIG. 2A-2E have routing and navigation information of the roads, which is helpful in navigating a vehicle driving on the roads. Moreover, the road maps are especially useful for autonomous vehicles which can drive without the participation of a driver because functional regions such as the bump regions, crosswalk regions and keep clear regions and traffic control objects are included in the road maps. During self-driving, the autonomous vehicles can generate various driving control instructions such as speeding, braking or taking a turn according to the traffic properties associated with these functional regions and traffic control objects, which makes the driving of the autonomous vehicle in compliance with traffic rules and improves safety.

FIG. 3-7 illustrate some exemplary road maps according to an embodiment of the application.

Figure 3:
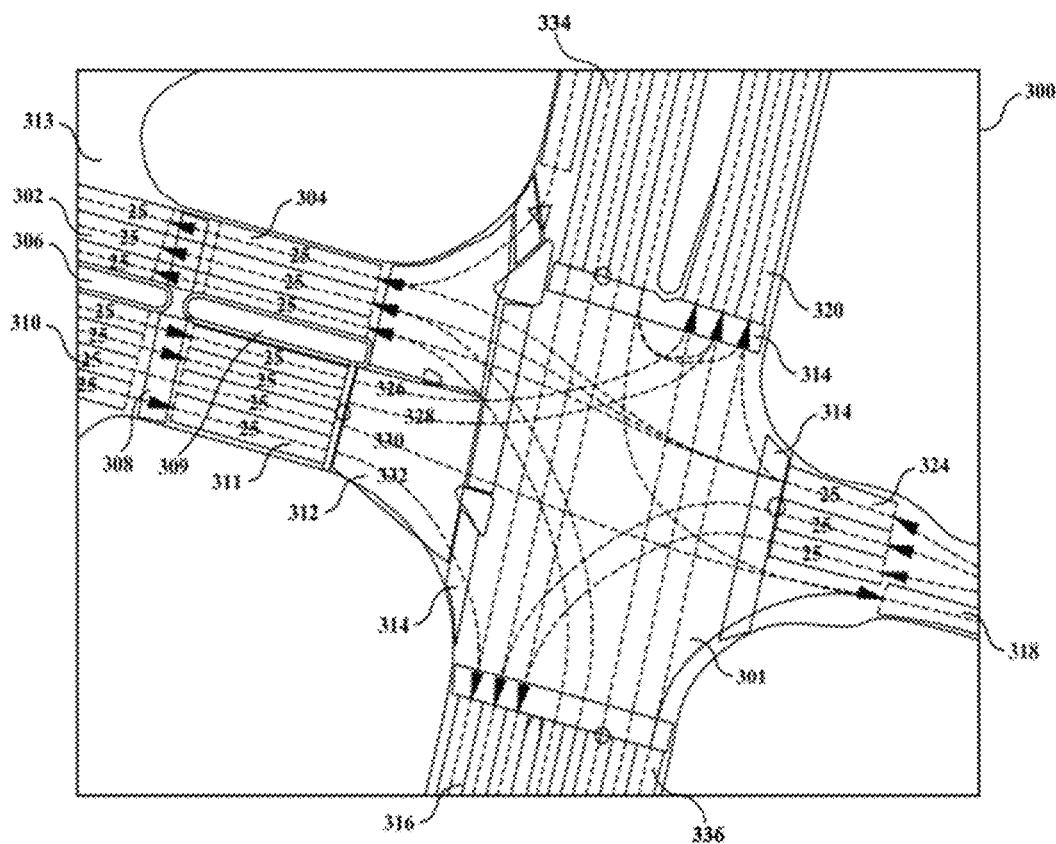
FIGS. 3-7 illustrate some exemplary road maps according to an embodiment of the application.

In certain embodiments, as illustrated in FIG. 3, the lane segments and/or road segments that are separated by a road connection region are linked such that an autonomous vehicle when driving through the road connection region can obtain necessary navigation information. Now referring to FIG. 3, an exemplary road map 300 has a crossing connection region 301, which connects several road segments at its four directions. Specifically, a road segment 302 and a road segment 304 are to the west of the crossing connection region 301, which are separated by a connection region 308. The road segment 302 is parallel with a road segment 310 and separated by a separation region 306. A road segment 311 is parallel with the road segment 304 and separated by a separation region 309. The separation regions 306 and 309 are discontinued by the connection region 308, such that a vehicle driving in the road segment 310 can drive to the road segment 302 by taking a U-shaped turn. A boundary line of the road segment 302 is discontinued by an exit 313. Each of the road segments have three or four lane segments separated by lane segment lines, and each of the lane segments are further indicated with waypoints at a lane centerline which help to indicate path or routes.

Road segments 316, 318 and 320 are to the south, east and north of the crossing connection region 301, respectively. Accordingly, vehicles driving in the road segment 311 can drive to one of these road segments 316, 318 and 320 according to a destination of the vehicle. Specifically, vehicles in the left-most two lane segments can drive to the road segment 320 by following connection lines 326 and 328 (i.e. left turn), vehicles in the middle lane segment can drive to the road segment 318 (i.e. drive straight) by following a connection line 330, and vehicles in the right most lane segment can drive to the road segment 316 by following a connection line 332 (i.e. right turn).

The road segment 318 is relatively narrow compared with the other road segments and thus has less lane segments. Accordingly, two or more connection lines may connect a lane segment of the road segment 318 with two or more lane segments of the other road segments such as the road segment 304. As shown in FIG. 3, three connection lines connect the lane segment 324 of the road segment 318 with three lane segments of the road segment 304, respectively. It can be readily appreciated that the connection lines may be generated based on the traffic properties of the lane segments of the two road segments being connected.

Some other functional regions and traffic control objects are also identified in the road map 300. A railway region 312 is adjacent to the road segments 304 and 311, and traffic control lights 314 are identified, which are used for controlling traffic flows in the road map 300. In some embodiments, the signals displayed in the traffic control lights 314 can be provided in the road map such that the properties associated with these regions can change among "red", "green" and "yellow", for example. Such traffic information can be incorporated into the road map in real-time during self-driving of an autonomous vehicle.

In certain embodiments, as illustrated in FIG. 3, the lane segments and/or road segments that are separated by a road connection region are linked such that an autonomous vehicle when driving through the road connection region can obtain necessary navigation information. Now referring to FIG. 3, the right-most lane segment of road segment 311 is connected to the right-most lane segment of road segment 316 through connection line 332, which merges with a connection line from a lane segment of road segment 334. Road segment 311 is linked to road segment 334 such that an autonomous vehicle when driving from road segment 311 to road segment 316 can obtain the navigation information of road segment 334 in order to plan route and avoid collision with vehicles from road segment 334. Similarly, two lane segment of road segment 311 are connected to the lane segments of road segment 320 through connection lines 326 and 328, which cross connection lines from road segments 324 and 334 and merge with a connection line from road segment 336. Road segment 311 is then linked to road segments 324, 334, and 336 such that an autonomous vehicle when driving from road segment 311 to road segment 320 can obtain the navigation information of road segments 324, 334 and 336 in order to plan the route and avoid collision with vehicles from road segments 324, 334 and 336. It can be understood that as a road segment comprises lane segments which are linked, the navigation information the autonomous vehicle obtained when driving through the road connection region include those of individual lane segments within the road segment.

Figure 4:
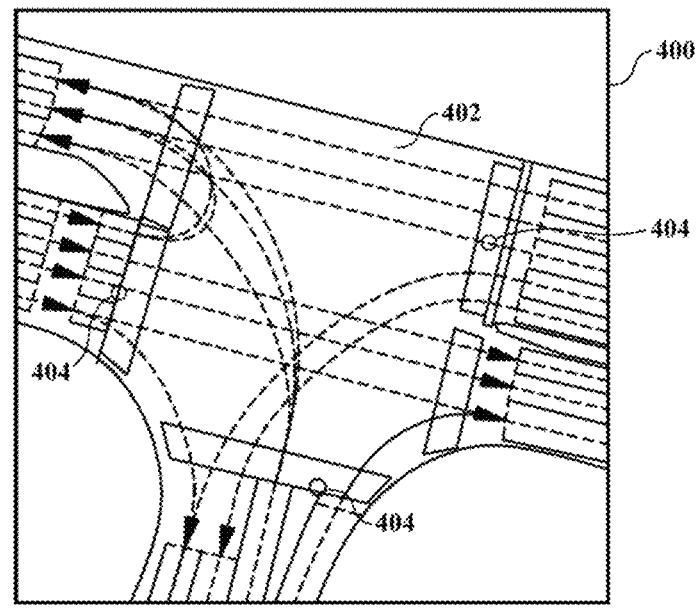

FIG. 4 illustrates another exemplary road map 400 according to an embodiment of the application. As shown in FIG. 4, the road map 400 has a T-shaped crossing connection region 402 which connects several road segments at its three directions. Between each of the road segments and the T-shaped crossing connection region 402, a traffic control light 404 is identified for traffic control.

Figure 5:
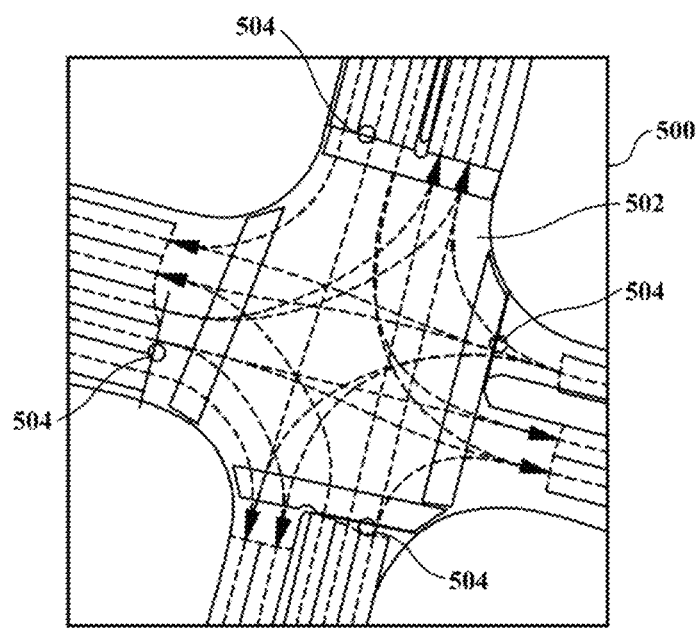

FIG. 5 illustrates another exemplary road map 500 according to an embodiment of the application. As shown in FIG. 5, the road map 500 has a crossing connection region 502 which connects several road segments at its four directions. Adjacent to each of the road segments, a stop sign 504 is identified.

Figure 6:
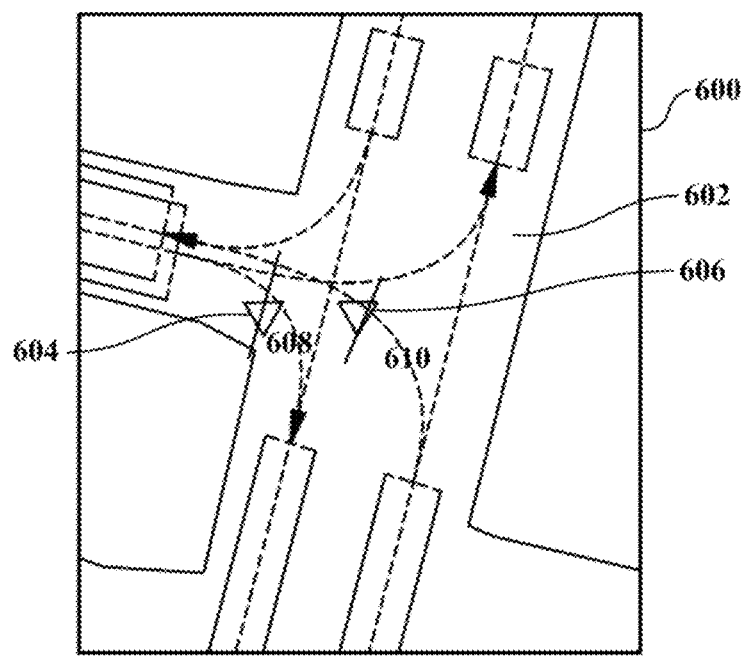

FIG. 6 illustrates another exemplary road map 600 according to an embodiment of the application. As shown in FIG. 6, the road map 600 has a T-shaped crossing connection region 602 which connects several road segments at its three directions. Two yield signs 604 and 606 are identified in the T-shaped crossing connection region 602, which are substantially located in two connection lines 608 and 610 to notify the vehicles following these connection lines.

Figure 7:
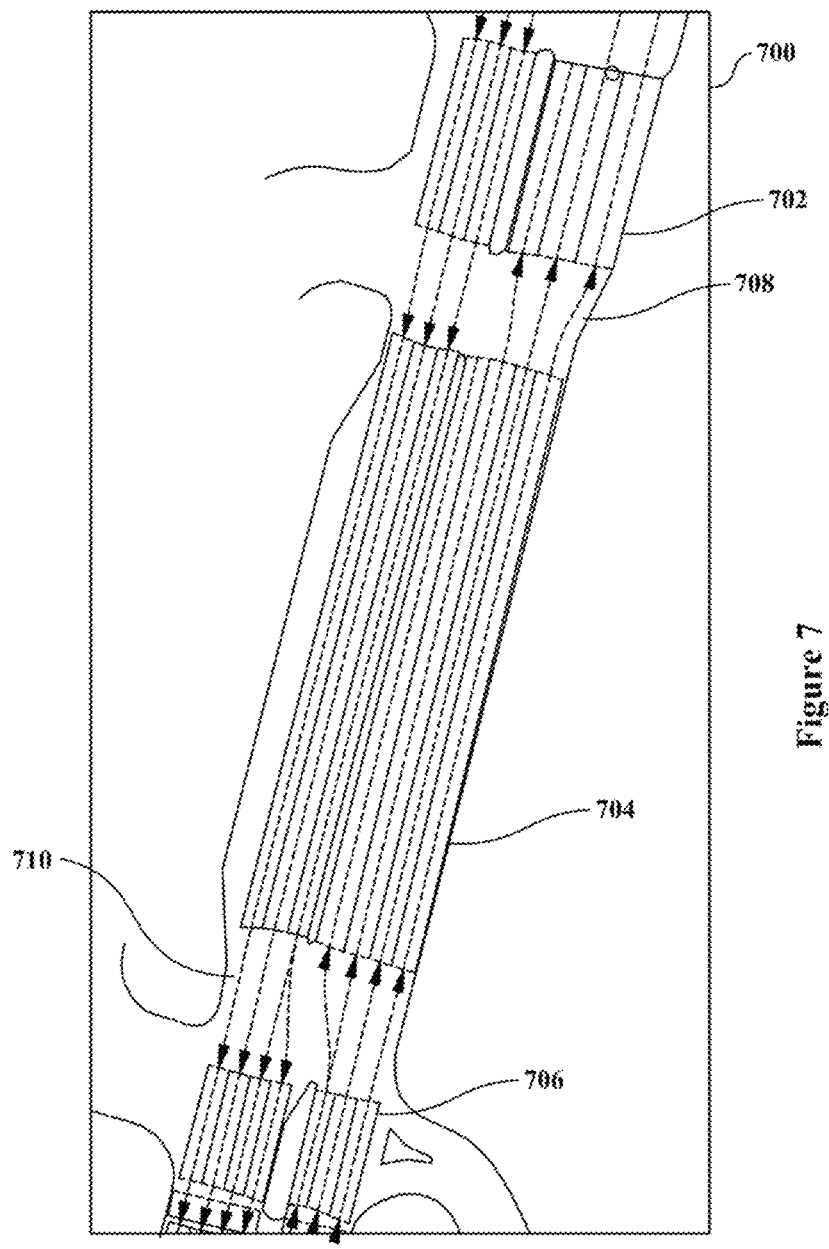

FIG. 7 illustrates another exemplary road map 700 according to an embodiment of the application. As shown in FIG. 7, the road map 700 includes road segments 702, 704 and 706 which are connected by two connection regions 708 and 710, respectively. The road segment 704 has four lane segments while the road segment 706 has three drive lanes, and thus at one of the lane segments of the road segment 706 are connected to two lane segments of the road segment 704.

The embodiments of the present application may be implemented by software or any other manner. The software may be stored in a memory and executed by appropriate instruction executing systems. For example, the software may be executed by a microprocessor or a specifically designed hardware. Those skilled in the art may understand that the previous method of the present application may be implemented by computer-executable instructions and/or control codes contained in the processor. For example, such codes may be provided in storage mediums such as hard disks, programmable memories such as ROM(s), or data mediums such as optical or electrical signal mediums.

Figure 8:
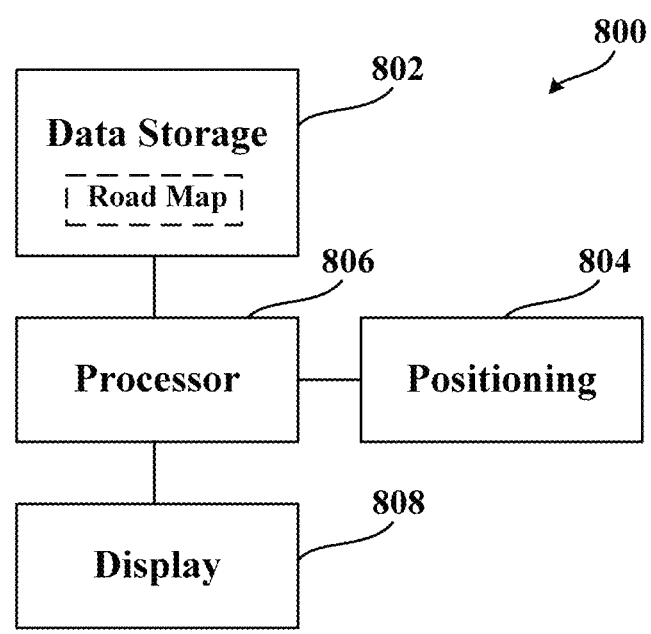
FIG. 8 illustrates a navigation device according to an embodiment of the application.

As mentioned above, the road maps generated according to the embodiments of the present application can be used for vehicle navigation. FIG. 8 illustrates a navigation device 800 according to an embodiment of the present application.

As shown in FIG. 8, the navigation device 800 includes a data storage 802 for storing a road map for vehicle navigation. The road map contains one or more road segments of a road which are defined by respective boundary lines and associated with respective traffic properties, and one or more traffic control objects corresponding to the one or more road segments and having respective traffic control indications that can affect a traffic flow in the road segments. The road map can be generated according to the embodiments of the application.

The navigation device 800 further includes a positioning module 804 for detecting a present position of a vehicle, and a processor 806. The processor 806 can be used to receive a destination of the vehicle, and calculate a route for the vehicle based on the road map, the present position of the vehicle and the destination of the vehicle. The destination of the vehicle can be input by a driver or passenger of the vehicle. The destination of the vehicle may be a coordinate point or a vector in a coordinate system of the road map. In some embodiments, the processor 806 may identify a vehicle position in the road map corresponding to the present position of the vehicle detected by the positioning module 804. For example, the vehicle position may be a coordinate point or a vector in the coordinate system of the road map, which is of a format the same as or similar to the destination of the vehicle. Afterwards, the processor 806 may further calculate the route for the vehicle which connects the vehicle position in the map and the destination of the vehicle. Data of the road map including the traffic properties of respective road segments can be used as constraints and costs in the computation of the route for the vehicle.

In some embodiments, the processor 806 can receive traffic information associated with the present position of the vehicle; and generate at least one driving control instruction based on the route and the traffic information. In this way, the vehicle can drive according to the at least one driving control instruction, without human driving operation. In some examples, the traffic information can be received from a communication module which forwards the traffic information from a remote server. In some other examples, the traffic information can be received from sensors carried on the vehicle, which detect other moving or non-moving objects on the road and generate corresponding measurement results.

In some embodiments, the navigation device 800 can further include a display 808 for displaying the present position of the vehicle and at least a portion of the road map associated with the present position of the vehicle. For example, a visualization software module can be used to process the road map and the route to generate a visual representation such as a set of images or a video of the vehicle in the road map. The visual representation can be displayed by the display 808, such that the driver or passenger in the vehicle can be aware of the route or other information associated with the vehicle navigation based on the road map.

The navigation device 800 can be carried on an autonomous vehicle.

What is claimed is:

1. A method for generating a road map for vehicle navigation, comprising:
   providing original road image data having an image of a road;
   identifying boundary lines defining respective lane segments of the road from the original road image data;
   associating traffic properties with the lane segments defined by the boundary lines, respectively;
   generating a series of waypoints for each lane segments, the series of waypoints are along a centerline of the lane segment, each waypoint contains information of lane geometry with lane boundaries, lane type and direction, lane speed limit, left/right lane segment, along with critical traffic control information and associated critical traffic zones;
   grouping the lane segments to generate road segments; and
   combining the road segments with traffic control objects corresponding thereto so as to generate the road map for vehicle navigation, wherein the traffic control objects have respective traffic control indications that can affect a traffic flow in the road segments;
   connecting the waypoints at the ends of the lane segments of neighboring road segments to generate one or more paths for vehicle navigation via lines or curves, the lines or curves are generated in consideration of navigation information associated with the waypoints of the lane segments, and the curves are generated further in consideration of at least 3 waypoints closest to the waypoints at the ends of the lane segments.

2. The method of claim 1, further comprising identifying a crosswalk region, a keep clear region, a bump region, a road connection region or a non-drive region.

3. The method of claim 1, wherein the traffic property is selected from the group consisting of drive way, speed limit, turning type, line type of the boundary line, crosswalk, keep clear, stop line, yield line and railway.

4. The method of claim 1, wherein the traffic control object is selected from a traffic control sign, a traffic control light, a traffic control pattern and a traffic control bulletin.

5. A navigation device, comprising:
   a data storage for storing a road map for vehicle navigation, wherein the road map is generated by the method of claim 1;
   a positioning module for detecting a present position of a vehicle; and
   a processor configured to:
      receive a destination of the vehicle, and
      plan a path and control a motion of the vehicle based on the connected waypoints of the road map, sensory information acquired by the vehicle, the present position and the destination of the vehicle.

6. The navigation device of claim 5, wherein the processor is further configured to:
   receive traffic information associated with the present position of the vehicle; and
   generate at least one driving control instruction based on the route and the traffic information, wherein the vehicle drives according to the at least one driving control instruction.

7. The navigation device of claim 5, wherein the one or more road segments comprise at least one drive region, and each of the at least one drive region comprises at least one lane segment associated with a traffic property.

8. The navigation device of claim 5, wherein the road map further comprises a drive region, a crosswalk region, a keep clear region, a bump region, a road connection region or a non-drive region.

9. The navigation device of claim 5, wherein the traffic property is selected from the group consisting of drive way, speed limit, turning type, a line type of the boundary line, crosswalk, keep clear, stop line, yield line and railway.

10. The navigation device of claim 5, wherein the traffic control object is selected from the group consisting of a traffic control sign, a traffic control light, a traffic control pattern and a traffic control bulletin.

11. The navigation device of claim 5, wherein the processor is further configured to:
    identify a vehicle position in the road map corresponding to the present position of the vehicle detected by the positioning module; and
    calculate the route for the vehicle connecting the vehicle position in the map and the destination of the vehicle.

12. A navigation method, comprising:
    providing a road map for vehicle navigation, wherein the road map is generated by the method of claim 1;
    receiving a present position of a vehicle and a destination of the vehicle; and
    plan a path and control a motion of the vehicle based on the connected waypoints of the road map, sensory information acquired by the vehicle, the present position and the destination of the vehicle.

13. The navigation method of claim 12, further comprising:
    receiving traffic information associated with the present position of the vehicle; and
    generating at least one driving control instruction based on the route and the traffic information, wherein the vehicle drives according to the at least one driving control instruction.

14. The navigation method of claim 12, wherein the one or more road segments comprise at least one drive region, and each of the at least one drive region comprises at least one lane segment associated with a traffic property.

15. The navigation method of claim 12, wherein the traffic control object is selected from the group consisting of a traffic control sign, a traffic control light, a traffic control pattern or a traffic control bulletin.

16. The navigation method of claim 12, wherein the step of calculating a route for the vehicle based on the road map, the present position of the vehicle and the destination of the vehicle comprises:
    identifying a vehicle position in the road map corresponding to the present position of the vehicle detected by the positioning module; and
    calculating the route for the vehicle connecting the vehicle position in the map and the destination of the vehicle.

* * * * *